US012465211B2

(12) United States Patent
Agarwala et al.

(10) Patent No.: US 12,465,211 B2
(45) Date of Patent: Nov. 11, 2025

(54) METHOD AND SYSTEM FOR OPERATING AN OPTOMETRY DEVICE

(71) Applicant: Carl Zeiss Vision International GmbH, Aalen (DE)

(72) Inventors: Rajat Agarwala, Tübingen (DE); Katharina Rifai, Tübingen (DE); Siegfried Wahl, Donzdorf (DE)

(73) Assignee: Carl Zeiss Vision International GmbH, Aalen (DE)

(*) Notice: Subject to any disclaimer, the term of this patent is extended or adjusted under 35 U.S.C. 154(b) by 0 days.

(21) Appl. No.: 19/086,464

(22) Filed: Mar. 21, 2025

(65) Prior Publication Data
US 2025/0213112 A1 Jul. 3, 2025

Related U.S. Application Data

(63) Continuation of application No. PCT/EP2023/077110, filed on Sep. 29, 2023.

(30) Foreign Application Priority Data

Sep. 30, 2022 (EP) .................................... 22199210

(51) Int. Cl.
| *A61B 3/113* | (2006.01) |
| *A61B 3/00* | (2006.01) |
| *A61B 3/14* | (2006.01) |
| *G01S 17/08* | (2006.01) |
| *G01S 17/86* | (2020.01) |

(52) U.S. Cl.
CPC ............ *A61B 3/113* (2013.01); *A61B 3/0025* (2013.01); *A61B 3/14* (2013.01); *G01S 17/08* (2013.01); *G01S 17/86* (2020.01)

(58) Field of Classification Search
CPC ......... A61B 3/113; A61B 3/0025; A61B 3/14; A61B 3/028; G01S 17/08; G01S 17/86
USPC .......................................................... 351/210
See application file for complete search history.

(56) References Cited

U.S. PATENT DOCUMENTS

| 7,656,509 B2 | 2/2010 | Haddock et al. |
| 11,221,488 B1 | 1/2022 | Kangas et al. |

(Continued)

FOREIGN PATENT DOCUMENTS

EP 3498149 A1 6/2019

OTHER PUBLICATIONS

Padmanaban et al., "Autofocals: Evaluating gaze-contingent eyeglasses for presbyopes," ACM SIGGRAPH 2018 Emerging Technologies, Article 3, pp. 1 to 2, Aug. 2018.

(Continued)

*Primary Examiner* — Mohammed A Hasan
(74) *Attorney, Agent, or Firm* — Tautz & Schuhmacher LLC; Georg Hasselmann

(57) ABSTRACT

A computer-implemented method for operating an optometry device includes the following steps: generating a first data set including information about a distance of a user of the optometry device to an object and tuning a tunable lens of the optometry device based on the distance of the user of the optometry device to the object based on the first data set. The first data set is generated by using a LiDAR sensor, which measures the distance of the user of the optometry device to the object by evaluating a scene represented by the first data set.

9 Claims, 7 Drawing Sheets

(56) References Cited

U.S. PATENT DOCUMENTS

| | | | |
|---|---|---|---|
| 2015/0154679 A1* | 6/2015 | Fonte | G02C 7/027 |
| | | | 703/1 |
| 2016/0299360 A1* | 10/2016 | Fonte | G02C 7/027 |
| 2017/0344838 A1* | 11/2017 | Zhou | G06V 40/113 |
| 2018/0081041 A1* | 3/2018 | Niclass | G01S 17/894 |
| 2020/0284883 A1* | 9/2020 | Ferreira | G01S 7/4815 |
| 2020/0379214 A1* | 12/2020 | Lee | G02B 27/0179 |
| 2022/0146819 A1 | 5/2022 | Boyle et al. | |
| 2024/0192774 A1* | 6/2024 | Sunray | G06T 7/80 |

OTHER PUBLICATIONS

Mompean et al., "Portable device for presbyopia correction with optoelectronic lenses driven by pupil response," Scientific Reports, vol. 10, No. 1, pp. 1 to 9, Nov. 2020.

Industrial Norm "Ophthalmic optics—Spectacle lenses—Vocabulary (ISO 13666:2019)," English version EN ISO ISO 13666:2019, Dec. 2019.

European Search Report issued in EP22199210.0, to which this application claims priority, mailed Mar. 17, 2023.

International Search Report and Written Opinion issued in PCT/EP2023/077110, to which this application claims priority, mailed Jan. 15, 2024.

International Preliminary Report on Patentability issued in PCT/EP2023/077110, to which this application claims priority, mailed Feb. 10, 2025.

Jarosz et al. "An original low-power opto-fluidic engine for presbyopia-correcting adaptive eyeglasses," Progress in Biomedical Optics and Imaging, SPIE—International Society for Optical Engineering, Bellingham, WA, US, vol. 10858, Feb. 28, 2019 (Feb. 28, 2019), pp. 1085824-1 to 1085824-7.

Hasan et al., "Adaptive Optics for Autofocusing Eyeglasses," Conference paper, Imaging and Applied Optics 2017, Jun. 2017.

Office Action by the Chinese Patent Office (SIPO) issued in CN 202380069530.9 , which is a counterpart hereof, mailed on Jul. 2, 2025, and English-language machine translation thereof.

* cited by examiner

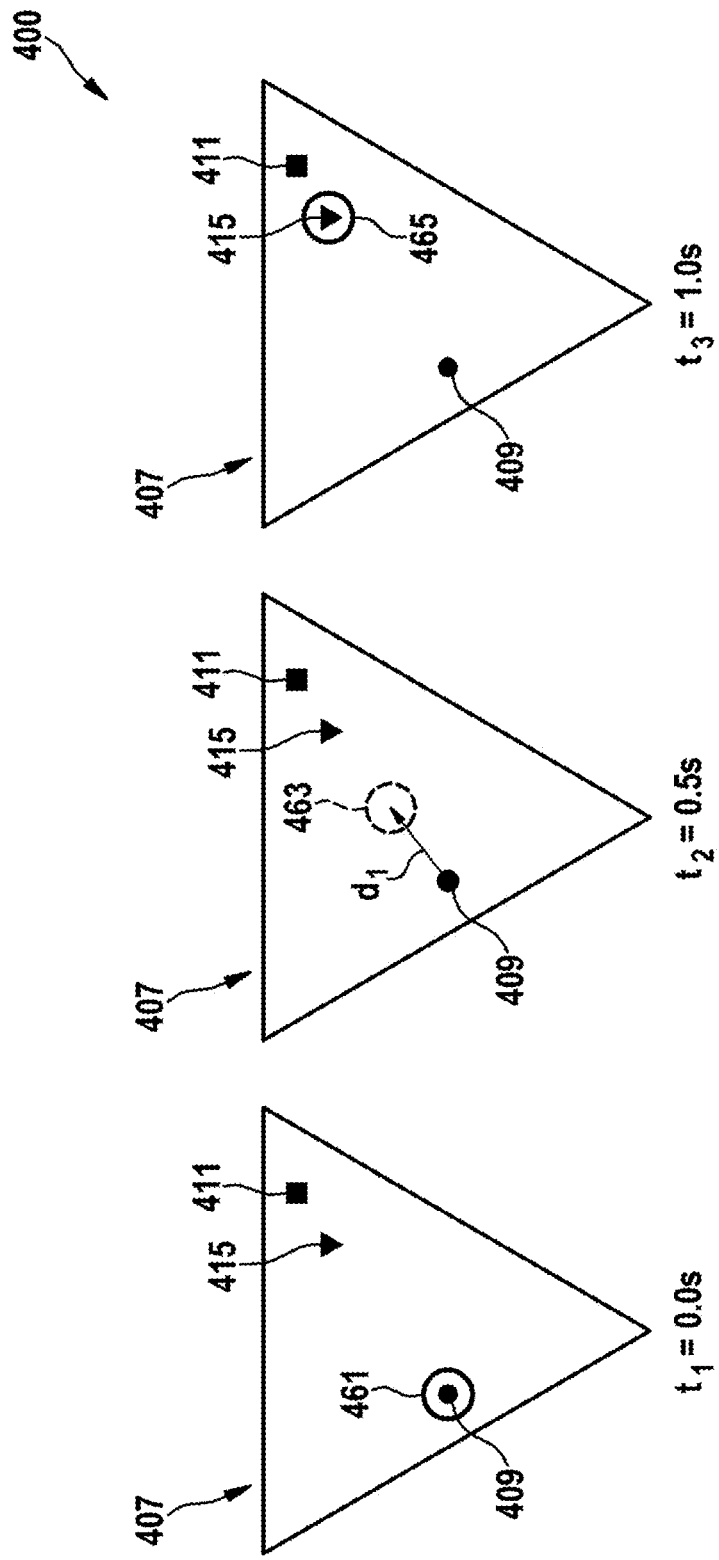

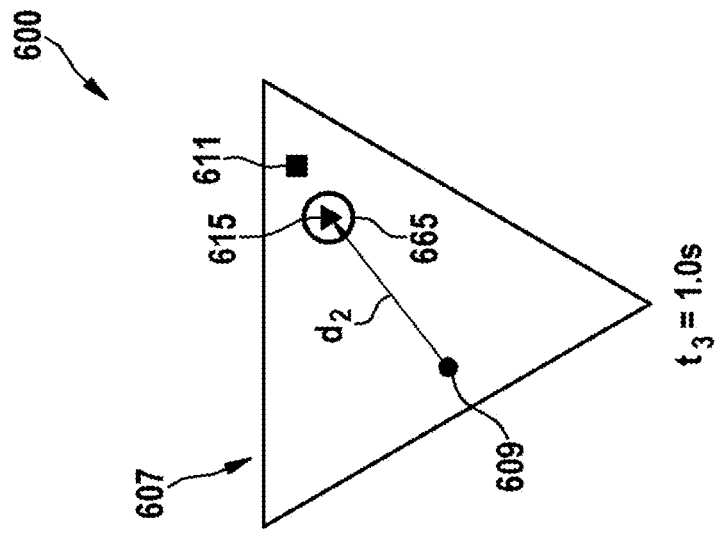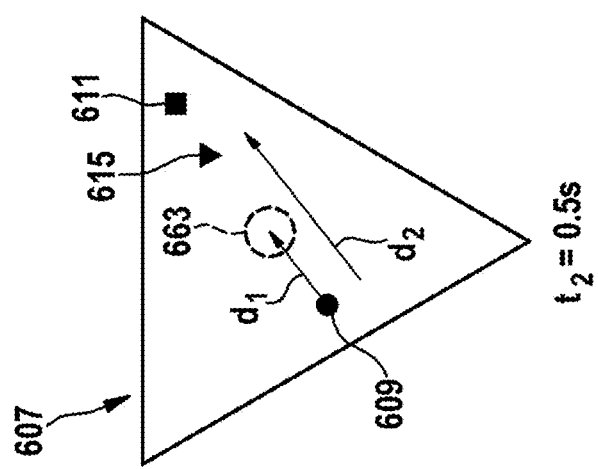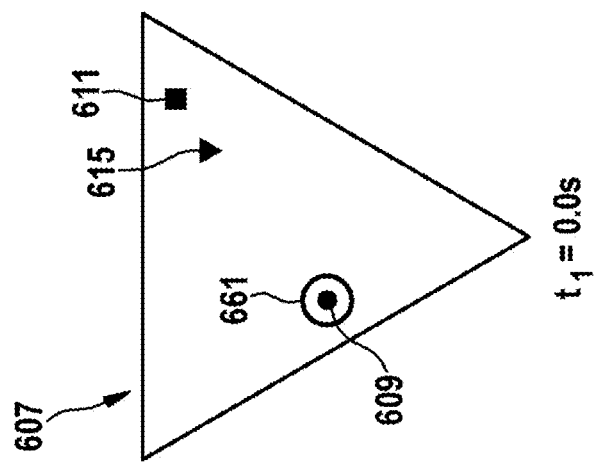

METHOD AND SYSTEM FOR OPERATING AN OPTOMETRY DEVICE

CROSS REFERENCE TO RELATED APPLICATIONS

This application is a continuation application of international patent application PCT/EP2023/077110, filed on Sep. 29, 2023 and designating the U.S., which claims priority to European patent application EP 22 199 210.0, filed on Sep. 30, 2022, both of which are hereby incorporated by reference in their entireties.

TECHNICAL FIELD

The present disclosure relates to a computer-implemented method for operating an optometry device determining a distance between a user and an object in a scene and a system comprising an optometry device determining a distance between a user and an object in a scene.

BACKGROUND

US 2022/0146819 A1 discloses a device and a method for gaze depth prediction. The device includes a camera assembly and a controller. The camera assembly is configured to capture images of both eyes of a user. Using the captured images, the controller determines a location for each pupil of each eye of the user. The determined pupil locations and captured images are used to determine eye tracking parameters which are used to compute values of eye tracking functions. With the computed values and a model that maps the eye tracking functions to gaze depths, a gaze depth of the user is determined.

EP 3 498 149 A1 discloses an optoelectronic binocular instrument for the automatic correction of presbyopia and method for the binocular correction of the presbyopia. The instrument has two optoelectronic lenses and a capturing subsystem for taking images of the eye. By means of the pupil tracking, which performs the processing of the eye's images, the system determines the distance where the subject is looking at. The pupil tracking works at a very high speed, using a high-performance graphic processor and a highly parallelized algorithm for pupil tracking. The method consists of two phases. In the first one a calibration is accomplished, the subject is asked to look at targets at different distances and the size and position of the pupil is measured. In the second phase the correction is performed by the instrument, the system continuously captures and processes images to calculate the correction to apply and, finally, corrects the presbyopia by applying the correction.

U.S. Pat. No. 7,656,509 B2 discloses devices for determining a distance. An object, a user of an electro-active lens is looking at, is presented. Once the distance is determined, the devices may alter the optical power of the electro-active lens to ensure that the object is correctly focused. Optical range finding is a possible means for carrying out this task. An active rangefinder may emit optical radiation from a transmitter directed at the object. The optical radiation may then be reflected off the object. The reflected optical radiation may then be received with an appropriate receiver. The received optical radiation may then be processed by appropriate circuitry to determine a distance to the object. A passive rangefinder works without a transmitter. Instead, an appropriate receiver receives ambient sources of light from the object. The received light may then be processed by appropriate circuitry to determine a distance to the object.

U.S. Pat. No. 11,221,488 B1 discloses a pair of eyeglasses which include one or more adjustable lenses that are each configured to align with a respective one of a user's eyes. The adjustable lenses include a foveated liquid crystal adjustable lens stacked with a nonliquid-crystal adjustable lens such as a fluid-filled lens or an Alvarez lens. The foveated adjustable lens include electrically modulated optical material such as one or more liquid crystal cells. The liquid crystal cells include arrays of electrodes that extend along one, two, three, four, or more than four directions. Control circuitry may apply control signals to the array of electrodes in each liquid crystal cell to produce a desired phase profile. Each lens may be foveated such that portions of the lens within the user's gaze exhibit a different phase profile than portions of the lens outside of the user's gaze.

US 2020/379214 A1 discloses an augmented reality (AR) device including a variable focus lens of which a focal length may be changed by adjusting refractive power and adjusting the position of a focus adjustment region of the variable focus lens according to a direction of the user's view. The AR device may obtain an eye vector indicating a direction of the user's view using an eye tracker, adjust a refractive power of a first focus adjustment region of a first variable focus lens to change a focal length for displaying a virtual image, and complementarily adjust a refractive power of a second focus adjustment lens with respect to the adjusted refractive power of the first focus adjustment region.

US 2018/081041 A1 relates to a lidar depth sensing apparatus. The apparatus includes a laser, which emits pulses of optical radiation toward a scene, and one or more detectors, which receive the optical radiation that is reflected from points in the scene.

Hasan, N., Karkhanis, M., Khan, F., Ghosh, T., Kim, H., & Mastrangelo, C. H. (2017), *Adaptive Optics for Autofocusing Eyeglasses*, in Optics InfoBase Conference Papers, doi.org/10.1364/AIO.2017.AM3A.1, describes an implementation of adaptive eyeglasses designed to restore the accommodation lost by age related presbyopia. The adaptive variable power eyepieces are driven by a battery-powered microcontroller system that measures the distance from the observer to the object and combines this with the observer's prescription to produce clear images at any object distance.

Mompcán, J., Aragón, J. L., & Artal, P. (2020), *Portable device for presbyopia correction with optoelectronic lenses driven by pupil response*, Scientific Reports, 10 (1), doi.org/10.1038/s41598-020-77465-5, describes a portable device, which has been developed and built to dynamically, and automatically, correct presbyopia by means of a couple of optoelectronic lenses driven by pupil tracking. The system is completely portable providing with a high range of defocus correction up to 10 D. The glasses are controlled and powered by a smartphone. To achieve a truly real-time response, image processing algorithms have been implemented in OpenCL and ran on the GPU of the smartphone. To validate the system, different visual experiments were carried out in presbyopic subjects. Visual acuity was maintained nearly constant for a range of distances from 5 m to 20 cm.

Padmanaban, N., Konrad, R. K., & Wetzstein, G. (2019), Autofocals: *Evaluating gaze—contingent eyeglasses for presbyopes*, in ACM SIGGRAPH 2019 Talks, SIGGRAPH 2019, Association for Computing Machinery, Inc, doi.org/10.1145/3306307.3328147, describes the estimation of the depth of the fixated object, which is dynamically estimated via sensor fusion of four "raw" inputs: two gaze-tracking cameras, a scene-facing depth camera, and the user's interpupillary distance (IPD). The binocular eye tracker estimates the vergence distance at 120 Hz. Small errors in the gaze direction estimation, however, introduce a noticeable bias in the estimated vergence. Although the depth sensor only runs at 30 Hz, together with the gaze direction, it compensates for the bias in the vergence measurements. The authors developed a custom sensor fusion algorithm to balance the accuracy and speed of the vergence estimation pipeline.

Jarosza J., Molliexa N., Lavignea Q. & Berge B. (2019), *An original low-power opto—fluidic engine for presbyopia-correcting adaptive eyeglasses*, in Ophthalmic Technologies XXIX, edited by Fabrice Manns, Per G. Soderberg, Arthur Ho, Proc. of SPIE Vol. 10858, 1085824, doi: 10.1117/12.2507816, describes a concept of presbyopia-correcting adaptive eyeglasses for people who do not accept corrective solutions. The proposed eyeglasses provide clear vision at all distances automatically and feature enhanced field of vision and high optical quality. The adaptive technology relies on an original fluid-filled lens whose focusing power is set by a low-power microfluidic pump inserted in the eyeglass temples. A LiDAR sensor is used for measuring the focusing distance.

A tunable lens in the state of the art typically comprises an IR camera for scene detection and an eye-tracking device for depth recognition. The tunable lenses in the state of the art typically comprise a limitation in terms of depth resolution as well as accuracy in distance estimation. Moreover, the tuning of the known tunable lenses is realized after the fixation point of a user is determined. Hence, the tuning of the tunable lens is trailing the fixation process of the user. Also, the scene context is typically not considered for operating a tunable lens.

SUMMARY

It is therefore an objective of the present disclosure to provide, in particular in view of U.S. Pat. No. 11,221,488 B1 and the publication of Jarosza et al., a computer-implemented method and a system, which overcome the above-mentioned limitations of the related art.

It is a particular objective of the present disclosure to provide a computer-implemented method and a system with a more accurate and faster approach of distance measurement for enabling a more accurate and natural tuning of an optometry device.

This problem is solved by a computer-implemented method and a system comprising an optometry device.

In a first aspect, the present disclosure relates to a computer-implemented method for operating an optometry device, comprising the following steps:

generating a first data set, the first data set comprising information about a distance of a user of the optometry device to an object, tuning a tunable lens of the optometry device based on the distance of a user of the optometry device to the object based on the first data set.

The computer-implemented method is characterized in that the first data set is generated by using a LiDAR sensor, the LiDAR sensor is measuring the distance of the user of the optometry device to the object by evaluating a scene represented by the first data set.

As generally used, the term "computer-implemented method" refers to a method which involves at least one apparatus, specifically a computer, or a plurality of apparatus, particularly connected via a computer network. The plurality of apparatus may be connected via a network by using at least one connection interfaces at any one of the apparatus of the plurality of apparatus. The computer-implemented method may be implemented as at least one computer program that may be provided on a storage medium carrying the computer program, whereby at least one of the steps of the computer-implemented method, are performed by using the at least one computer program. Alternatively, the at least one computer program may be accessible by an apparatus which may be adapted for performing the method via a network, such as via an in-house network or via internet.

The term "optometry device" refers to a device which processes light waves. Within the scope of this disclosure the term "optometry device" refers to at least a spectacle lens, a binocular, contact lenses or any other device that corrects or detects an error of the eye of a user.

The term "data set" describes in context of the present disclosure an item, such as a numeric or an alphanumeric item, which comprises at least one piece of information. The data may be provided in machine readable form, such that it may be input or output of a machine learning model, particularly of any neural network comprised by the machine learning model or it may be input or output of a computer-implemented method. In particularly view of the present aspect, the term "first data set" refers to an output of a LiDAR sensor. This output may be represented by a point cloud or a numerical information about the distances of multiple objects in a scene.

As generally used, the term "tuning" or any grammatical variation thereof refers to a process of adjusting the focal power of an optometry device.

The term "focal power" is a collective term for the spherical vertex power, which brings a paraxial pencil of parallel light to a single focus, and the cylindrical vertex power of a spectacle lens, which brings a paraxial pencil of parallel light to two separate line foci mutually at right angles (DIN ISO 13666:2019, section 3.10.2).

The term "tunable lens" refers to a light focusing device—in the form of either a fluid, a gel or a solid—that is able to use an input electrical energy to dynamically modulate its focal length. Therefore, in a tunable lens it is possible to modify, by electrical means, some internal properties that change the shaping of the light wavefront.

An example of a tunable lens is a shape-changing lens based on a combination of optical fluids and a polymer membrane. The core element consists of a container, which is filled with an optical liquid and sealed off with a thin, elastic polymer membrane. An optical liquid can be a transparent liquid with defined optical properties, such as a refractive index. A circular ring that pushes onto the center of the membrane shapes the tunable lens. The deflection of the membrane and with that the radius of the lens can be changed by pushing the ring towards the membrane, by exerting a pressure to the outer part of the membrane or by pumping liquid into or out of the container. Other examples of a tunable lenses are an Alvarez lens, which shifts a complementary pair of cubic phase plates relative to each other to vary optical power, and a lens with liquid crystal technology, which change with an electric current the orientation of the liquid crystal and changes thereby the refraction of the light.

The term "LiDAR" is an acronym of "light detection and ranging" or "laser imaging, detection, and ranging." LiDAR sensors are used for determining ranges by targeting an object or a surface with a laser and measuring the time for the reflected light to return to the receiver. In the present disclosure it is used for distance measuring of a mobile application.

As generally used, the term "evaluating" or any grammatical variation thereof refers to a process of analyzing a scene. The term "scene" describes in context of the present disclosure a visual field of a person or a field of view of a digital device such as a LiDAR sensor or a camera. In the context of this disclosure a scene is represented by an image, a video or a data set. As used herein, the term "image" refers to a single picture, particularly a picture of an environment. As used herein, the term "video" refers to a plurality of images of an environment.

With the computer-implemented method-which includes the use of a LiDAR sensor for measuring the distance of a user of the optometry device to the object and a further step of tuning a tunable lens of the optometry device based on the distance of a user of the optometry device to the object—a more precise distance measuring is realized. Hence, a more accurate tuning of the tunable lens of the optometry device is achieved. This results in a higher comfort of wear of the user of the optometry device.

In an exemplary embodiment, the computer-implemented method comprises the step of generating a second data set by recording an image of the scene by a camera.

The term "second data set" refers to an output of a camera. This output may be represented by an image or a video. The image or the video comprises a scene with at least one recognizable object. In the present disclosure the scene of the "second data set" is recorded substantially parallel to the scene of the "first data set." In other words, the camera and the LiDAR sensor are observing the same objects in a scene but provide different data sets representing the same scene.

Moreover, the first data set and the second data set comprise different data formats and different acquisition parameters. The first data set recorded by the LiDAR sensor may comprise a point cloud of the scene with different distances of points recognized within the scene. The first data set may be recorded with a resolution of 940 pixel×560 pixel and a frame rate of 30 fps. The second data set recorded by the camera may comprise at least one image of the same scene recorded by the LiDAR sensor. The second data set may be recorded with a resolution of 1920 pixel×1080 pixel and a frame rate of 30 fps. Accordingly, the resolution with which the second data set is recorded can be higher than the resolution with which the first data set is recorded. Alternatively, the resolution with which the first data set is recorded can be higher than the resolution with which the second data set is recorded.

If the resolution of the first data set is not equal to the resolution of the second data set, the data set with the larger resolution may be downsized to the smaller resolution of the other data set. Alternatively, the data set with the smaller resolution may be interpolated to the higher resolution of the other data set. In the above mentioned example, the resolution of the second data set recorded by a camera may be downsized to the resolution of the first data set recorded by the LiDAR sensor. Hence, the resolution of the second data set would be downsized to 940 pixel×560 pixel.

Moreover, the field of view of the first data set may be at least slightly broader compared to the field of view of the second data set. In this case, the field of view of the first data set is cropped to the field of view of the second data set. Alternatively, the field of view of the second data set may be at least slightly broader compared to the field of view of the first data set.

If the frame rate of the first data set is not equal to the frame rate of the second data set, the data set with the larger frame rate may be downsized to the smaller frame rate of the other data set. In the above mentioned example, the frame rate of the second data set recorded by a camera is equal to the frame rate of the first data set recorded by the LiDAR sensor. Hence, the frame rate of the second data set would not be downsized.

The second data set of the computer-implemented method enables an evaluation of the recorded scene. Hence, the further step of tuning a tunable lens of the optometry device is based and optimized by the information of the recorded scene. This results in a more natural adjustment of focus of the tunable lens of the optometry device.

In an exemplary embodiment, the computer-implemented method comprises the step of generating the second data set by recording an image of the scene by an RGB camera.

The term "RGB camera" refers to a camera that provides an image matrix. Each point in the grid is assigned to a color value. The resolution of an image is calculated from the number of rows and columns. The output of an RGB camera may be represented by an image or a video. The image or the video comprise a scene with at least one recognizable object. In the present disclosure the scene of the "second data set" is recorded parallel or substantially parallel to the scene of the "first data set." In other words, the RGB camera and the LiDAR sensor are observing the same objects in a scene but provide different data sets representing the same scene.

The second data set recorded by an RGB camera enables an evaluation of the recorded scene. Hence, the further step of tuning a tunable lens of the optometry device is based and optimized by the information of the recorded scene. This results in a more natural adjustment of focus of the tunable lens of the optometry device.

In an exemplary embodiment, the computer-implemented method comprises the further step of identifying the object by evaluating the scene represented by the second data set.

As generally used, the term "identifying" or any grammatical variation thereof refers to an identification process after recording the image of the scene. At the end of the identification process an object can be identified and selected for tuning an optometry device based on the distance of the identified and selected object to the user of the optometry device.

The further step of identifying the object enables the computer-implemented method not only to recognize but also to identify an object within the recorded scene. Hence, the further step of identifying the object leads to a further step of tuning the tunable lens of the optometry device based on a known and identified object. The object is identified within the scene by recording an image with the RGB camera and the distance of the object to the user of the optometry device is determined by data measured by the LiDAR sensor and the distance is allocated to the object. This results in a more natural adjustment of focus of the tunable lens of the optometry device and leads to a better comfort of wear for the user of the optometry device.

In an exemplary embodiment, the computer-implemented method of identifying the object comprises the following sub-steps:
  recognizing a plurality of objects in the image of the scene represented by the second data set and,
  using a first data library for generating an identification probability factor for each recognized object of the plurality of objects and, assigning the identification probability factor to each object of the plurality of objects based on the first data library and, comparing the identification probability factor of each identified object of the plurality of objects with a predefined identification probability threshold and, using a second data library for generating a selection probability factor for each identified object of the plurality of objects having an identification probability factor larger than the predefined identification probability threshold and, comparing the selection probability factor of at least each identified object of the plurality of objects having an identification probability factor larger than the predefined identification probability threshold with a predefined selection probability threshold and, determining the distance of the user of the optometry device to the identified object with the largest selection probability factor, wherein the selection probability factor of the identified object is larger than the predefined selection probability threshold.

In a first step of the identifying process, a plurality of objects in the recorded image of the scene may be recognized. As generally used, the term "recognizing" or any grammatical variation thereof refers to an identification sub-step after recording the image of the scene. At the end of the first step of the identification process, the existence of an object withing a scene may be known. Recognizing an object within the scope of this disclosure can be achieved by evaluating the first or, typically, the second data set.

In a further step of the identifying process, a first data library for generating an identification probability factor for each recognized object of the plurality of objects is used. At the end of the further step of the identification process, the identity of a recognized object in the scene is known based on a certain probability.

The term "data library" describes in context of the present disclosure a collection of numerical methods, machine learning models or artificial intelligence-based algorithms. In the present disclosure the term "first data library" describes a collection of trained machine learning models for identifying an object within a scene context, the trained machine learning model comprises at least one identification probability factor. The identification probability factor for an object can be stored in a table or any other form of an information storage within the first data library. An example for the first data library is TensorFlow, Image Net, or PyTorch.

The machine learning model has been trained to recognize and identify at least one object and the context in which the object is detected. An object can be for example a computer keyboard and the context can be a computer keyboard on an office desk. The computer keyboard and the office desk together with the surroundings do represent a scene. As used herein, the term "trained machine learning model" refers to a model of a machine learning model, specifically comprising at least one neural network, that is trained, particularly trained to determine at least one identification probability factor.

The term "identification probability factor" refers to a certain probability that the trained machine learning model generates from analyzing the recognized object within the second data set. The previously mentioned example comprises a computer keyboard on an office desk. In this example the trained machine learning model generates an identification probability factor, that the recognized object is a computer keyboard on an office desk. The identification probability factor can contain a value in the range from 0 to 1, with 0 and 1 included, which equals to 0% to 100%. An identification probability factor of 0 is equal to 0% and means that the first data library does not know which object is recognized in the context. Hence, there is no such data available for training the machine learning model to identify for example a computer keyboard on a desk. In this case the machine learning model may be trained in a further step. An identification probability factor of 1 is equal to 100% and means that the first data library does know with the highest possible probability which object is recognized in the context. Hence, there is enough data available for training the machine learning model to identify for example a computer keyboard on a desk. In this case the machine learning model does not need to be trained in a further step. The identification probability factor comprises, typically, the identification probability of at least one object within a context or, alternatively, the identification probability factor of at least one object without a context.

The term "generating" or any grammatical variation thereof refers to a process of generating a certain information within the scope of this disclosure. This can refer for example to generate an identification probability factor or to generate a data set. An information can be generated by calculation, recording, extracting, assigning, deriving, processing, loading, predicting or any other possible step of information generation.

In a further step of the identifying process, the identification probability factor is assigned to each object of the plurality of objects based on the first data library. At the end of the further step of the identification process, an identification probability factor is assigned to recognized objects in the scene.

The term "assigning" or any grammatical variation thereof refers to a process of merging one piece of information with a second piece of information. For example, the second data set can provide the existence of an object. The first data library generates the identification probability factor of the object. By assigning a particular identification probability factor of a certain percentage to the recognized object, the computer-implemented method knows that e.g. a computer keyboard on a desk is identified within the scene with a probability of the certain percentage. The certain percentage is in a range from 0% to 100%.

In a further step of the identifying process, the identification probability factor of each identified object of the plurality of objects is compared with a predefined identification probability threshold. At the end of the further step of the identification process, all objects with an identification probability factor below the predefined identification probability threshold are ignored for further steps. If no identified object comprises a larger identification probability factor compared to the predefined identification probability threshold than, i) the predefined identification probability threshold may be decreased to the highest assigned identification probability factor of the recognized objects in order to ensure the further processing of the computer-implemented method or ii) the computer-implemented method stops at this step, does not tune the tunable lens and proceeds with the next scene in order to tune the tunable lens of the optometry device. Alternatively, if no object can be identified, the tunable lens can be tuned to a default distance, for example to infinite, or to another distance based on raw data of the first data set. If more than one identified object comprises a larger identification probability factor compared to the predefined identification probability threshold, then all such objects will pass to the next step of the identifying process.

The term "predefined identification probability threshold" refers to a filter step for further processing of identified objects. The predefined identification probability threshold can contain a value in the range from 0 to 1, with 0 and 1 included, which equals to 0% to 100%. In an exemplary embodiment the value of the predefined identification probability threshold is between 0.5 and 0.9, which equals to 50% to 90%. In an exemplary embodiment, the value of the predefined identification probability threshold is between 0.6 and 0.8, which equals to 60% to 80%. In a most preferred embodiment, the value of the predefined identification probability threshold is 0.7, which equals to 70%.

In a further step of the identifying process, a second data library for generating a selection probability factor for each identified object of the plurality of objects, or at least for all objects having an identification probability factor equal or larger that the identification probability threshold, is used. At the end of the further step of the identification process, identified objects are selected, the selected objects comprise a certain selection probability of being observed by the user of the optometry device.

In the present disclosure the term "second data library" describes a collection of trained machine learning models for selecting an object within a scene context, the trained machine learning model comprises at least one selection probability factor. The selection probability factor for an object can be stored in a table or any other form of an information storage within the second data library. The selection probability factor of the second data library is based on the selection probability of the user of the optometry device.

Moreover, the second data library comprises individual characteristics of a user. For example, a user above the age of retirement shows a smaller selection probability factor for changing the visual field to a computer compared to a younger user who works with computers on daily basis. The younger user will show a larger selection probability factor for computers as compared to the user above the age of retirement. Alternatively, a past behavior of the user, taken from the second data library, shows that the user never looks at computers. Hence, the selection probability factor of that user for a computer is small. Other parameters like time of the day, day of the week etc. which impact the visual behavior, and thus selected objects can also be comprised in the second data library. Examples for the second data library are DeepGaze or SCEGRAM.

The machine learning model has been trained to select at least one object out of the context in which the object is detected. An object can be for example a computer keyboard and a computer mouse and the context can be a computer keyboard and a computer mouse on an office desk. As used herein, the term "trained machine learning model" refers also to a model of a machine learning model, specifically comprising at least one neural network, that is trained, particularly trained to determine at least one selection probability factor.

The term "selection probability factor" refers to a certain probability that the trained machine learning model generates from analyzing the recognized and identified object(s) within the second data set. The previously mentioned example comprises a computer keyboard and a computer mouse on an office desk. In this example the trained machine learning model generates a selection probability factor, for the recognized and identified objects. In other words, the machine learning method generates a value which comprises a selection probability for a plurality of objects within a scene. The selection probability factor can contain a value in the range from 0 to 1, with 0 and 1 included, which equals to 0% to 100%. A selection probability factor of 0 is equal to 0% and means that based on the second data library the selection probability that the user will focus the recognized and identified object in this context does not exist. A selection probability factor of 1 is equal to 100% and means that based on the second data library the selection probability that the user will focus the recognized and identified object in this context is 100%. The selection probability factor comprises, preferably the selection probability of at least one object within a context or alternatively, the selection probability of at least one object without a context. The selection probability factor for a particular object, accordingly, is a measure for the probability or likelihood that a user will focus on this particular object.

In a further step of the identifying process, the selection probability factor of at least each identified object of the plurality of objects having an identification probability factor larger than the predefined identification probability threshold is compared with a predefined selection probability threshold. At the end of the further step of the identifying process, all objects with a selection probability factor below the predefined selection probability threshold are ignored for consecutive further steps.

If no identified object comprises a larger selection probability factor compared to the predefined selection probability threshold than, i) the predefined selection probability threshold may be decreased to the highest assigned selection probability factor of the recognized and identified objects in order to ensure the further processing of the computer-implemented method or ii) the computer-implemented method stops at this step, does not change the focus of the tunable lens and proceeds with the next scene in order to tune the tunable lens of the optometry device. If more than one identified object comprises a larger selection probability factor compared to the predefined selection probability threshold, then the object with the larger selection probability factor will pass to the next step of the identifying process.

The term "predefined selection probability threshold" refers to a filter step for further processing of identified object. The predefined selection probability threshold can contain a value in the range from 0 to 1, with 0 and 1 included, which equals to 0% to 100%. In an exemplary embodiment the value of the predefined selection probability threshold is between 0.5 and 0.9, which equals to 50% to 90%. In an exemplary embodiment, the value of the predefined selection probability threshold is between 0.6 and 0.8, which equals to 60% to 80%. In a most preferred embodiment, the value of the predefined selection probability threshold is 0.7, which equals 70%.

In a further step of the identifying process, the distance of the user of the optometry device to the identified object with the largest selection probability factor is determined based on the step of comparing the selection probability factor of at least each identified object of the plurality of objects having an identification probability factor larger than the predefined identification probability threshold with a predefined selection probability threshold and selecting the object with the highest selection probability factor. At the end of the further step of the identifying process, the computer-implemented method is able to tune a tunable lens of the optometry device based on the distance of a user of the optometry device to the object with the highest selection probability factor based set, on the second data set.

The further step of identifying the object, enables the computer-implemented method not only to recognize but also to identify an object within the recorded scene. Hence, the further step of identifying the object leads to a further step of tuning the tunable lens of the optometry device based on a known and identified object. This results in a more natural and more accurate adjustment of focus of the tunable lens of the optometry device and leads to a better comfort of wear for the user of the optometry device. Moreover, tuning a tunable lens may be achieved before the user is changing the view to another object.

In an exemplary embodiment, the computer-implemented method is characterized in that machine learning algorithms are used to determine the identification probability factor stored in the first data library and the selection probability factor stored in the second data library.

The further step of identifying the object, enables the computer-implemented method to load an identification probability factor or a selection probability factor from the first data library or the second data library without the need of calculating a new identification probability factor or a new selection probability factor. This results in a faster adjustment of focus of the tunable lens of the optometry device and leads to a better comfort of wear for the user of the optometry device. Moreover, tuning a tunable lens can be achieved before the user is changing the view to another object.

In an exemplary embodiment, the computer-implemented method is characterized by generating a third data set, the third data set comprising gaze information of the user of the optometry device, predicting a next gaze of the user based on the third data set, and tuning the tunable lens of the optometry device based on the predicted next gaze of the user.

In a particular embodiment of the present aspect, the term "third data set" refers to an output of an eye tracking sensor. This output may be represented by an RGB image or a numerical information about a saccade and/or a fixation point of a user in the context of a scene. The term "saccade" refers to a movement of at least one eye between two or more phases of fixation in the same direction. The term "fixation" or "fixation point" refers to a moving behavior of the eye. During a "fixation" a spatial location of the gaze is situated constantly on a single location. In other words, if a fixation is reached, the eye does not move in a recognizable fashion.

The term "gaze information" refers to the visual field of the user of the optometry device and may refer to the change in the line of sight of the person. Based on DIN ISO 13666:2019, Section 3.2.24, the term "line of sight" refers to a path from a point of interest, i.e. a point of fixation (or fixation point), in object space to a center of an entrance pupil of the eye of the person and, further, comprises a continuation in image space from a center of an exit pupil to a retinal point of fixation, generally the foveola, in the eye of the person. The term "predicted next gaze" refers to the estimated next visual field of the user of the optometry device.

The term "next fixation point" describes in context of the present disclosure the end of a saccade and the beginning of a new fixation. The term "predicted next fixation point" refers to a next fixation point which is generated based on the third data set.

The third data set of the computer-implemented method recorded by an eye tracker sensor enables an evaluation of the eye movement of the user based on the recorded scene represented by the first and second data set. Hence, the further step of tuning a tunable lens of the optometry device is based and optimized by the predicted next fixation point of the user. This results in a faster adjustment of focus of the tunable lens of the optometry device and leads to a better comfort of wear for the user of the optometry device. Moreover, tuning a tunable lens can be achieved before the user is changing the view to another object.

In an exemplary embodiment, the computer-implemented method is characterized by predicting the next gaze of the user comprising the following steps:
  determining a current fixation point of the user of the optometry device based on the third data set and,
  assigning the object based on the second data set and the distance of the object to the user of the optometry device based on the first data set to the current fixation point of the user of the optometry device and,
  tracking the current fixation point of the user of the optometry device based on the third data set until a next saccade of the user of the optometry device is recognized by detecting a change in gaze position and,
  predicting a next fixation point of the user of the optometry device based on the current fixation point of the user of the optometry device and the recognized next saccade of the user of the optometry device and,
  tuning the optometry device according to the predicted next fixation point.

In a first step of the predicting process, a current fixation point of the user of the optometry device based on the third data set is determined. At the end of the first step of the predicting process, the fixation point is determined for the beginning of a new saccade, represented by the time t=0.

The term "current fixation point" refers to i) the fixation point which is already established when the predicting process starts or to ii) a fixation point which is detected after the predicting process starts.

In a further step of the predicting process, the object identified and selected based on the second data set and the distance of the object to the user of the optometry device based on the first data set are assigned to the current fixation point of the user of the optometry device. Alternatively, with the further step of the predicting process, the current fixation point is assigned to an object identified and selected based on the second data set and to a distance of the user of the optometry device to the object based on the first data set.

In a further step of the predicting process, the current fixation point of the user of the optometry device is tracked based on the third data set until a next saccade of the user of the optometry device is recognized by detecting a change in gaze position. At the end of the further step of the predicting process, the beginning of a new saccade is detected.

The term "tracking" or any grammatical variation thereof refers to a process of identifying a change in information within the scope of this disclosure. This can refer for example to track a scene or a gaze position. A change of information can be tracked by observing, detecting, analyzing, searching or any other possible step of identifying a change in information.

In a further step of the predicting process, a next fixation point of the user of the optometry device is estimated based on the current fixation point of the user of the optometry device and the recognized next saccade of the user of the optometry device. At the end of the further step of the predicting process, the next fixation point of the user of the optometry device is predicted.

The term "predicting" or any grammatical variation thereof refers to a process of estimating an information within the scope of this disclosure. This can refer for example to predict a scene or a fixation point. Estimating an information can be carried out by calculating, interpolating, comparing, guessing or any other step of estimating an information.

In a further step of the predicting process, the optometry device is tuned according to the predicted next fixation point.

The further step of identifying the object, enables the computer-implemented method to estimate the next fixation point of the user of the optometry device. This results in a faster adjustment of focus of the tunable lens of the optometry device and leads to a better comfort of wear for the user of the optometry device. Moreover, tuning a tunable lens can be achieved before the user is changing the view to another object.

In an exemplary embodiment, the computer-implemented method is characterized in that predicting the next fixation point comprising at least one of the following steps:
  determining a gaze direction of the recognized next saccade and predicting the next fixation point based on previous gaze information of the user
  determining a gaze direction of the recognized next saccade and predicting the next fixation point based on the next selectable object within the determined gaze direction
  determining a gaze direction of the recognized next saccade and predicting the next fixation point based on an object within the determined gaze direction, the object comprising the highest selection probability factor.
  using a predefined next scene of the second data library and assigning the distance of the object to the user of the optometry device based on the first data set and adjusting the estimation of the next fixation point based on the predefined next scene;
  estimating a next scene by generating a fourth data set, the fourth data set comprising electrical brain activity information of the user of the optometry device and adjusting the estimation of the next fixation based on estimated next scene;
  estimating a next scene by generating a fifth data set, the fifth data set comprising inertial measurement information of the optometry device (110, 710) and adjusting the estimation of the next fixation point (365, 465, 565, 665) based on estimated next scene.

A step of predicting the next fixation point may be realized by determining a gaze direction of the recognized next saccade and predicting the next fixation point based on previous saccade information of the user.

The term "gaze direction" refers to spatial localization detection of the current saccade. Starting from the current fixation point, the next saccade can move in every spatial direction, e.g. in the northeast direction. The gaze direction can be specified in the form of celestial directions, global or local coordinate systems or by spatial directions.

The term "previous gaze information" refers to a sample of previous gaze information of the user of the optometry device or of a standard user of the optometry device. The previous gaze information can comprise data of a saccade distance length, a saccade duration, a fixation point and a fixation duration. The previous gaze information is generated and stored in the third data set.

Starting from a current fixation point and the beginning of a next saccade, the next fixation point is predicted by analyzing the last saccade distance length and/or the last saccade duration.

An alternative step of predicting the next fixation point may be realized by determining a gaze direction of the recognized next saccade and predicting the next fixation point based on the next selectable object within the determined gaze direction.

The term "next selectable object" refers to an object within the saccade direction. Furthermore, the next selectable object is identifiable and selectable based on the second data set. Hence, the identifiable and selectable object comprises an identification probability factor larger than the predefined identification probability threshold and a selection probability factor larger than the predefined selection probability threshold.

Starting from a current fixation point and the beginning of a next saccade, the next fixation point is predicted by analyzing the saccade direction. For example, if the beginning of the next saccade indicates a gaze direction in northeast direction and an object in the northeast direction is identifiable and selectable based on the second data set, then the next fixation point will be set at the object. If more than one objects within the saccade direction are identifiable and selectable based on the second data set, then the next fixation point is set on the object closer to the current fixation point. The object closer to the current fixation point represents in the context of the disclosure the "next selectable object."

If no object within the saccade direction is identifiable and selectable based on the second data set, then i) the predefined identification probability threshold and/or the predefined selection probability threshold may be decreased to the highest assigned identification probability factor and/or the next fixation point is set to the object with the highest assigned selection probability factor of the recognized and identified objects in order to ensure the further processing of the computer-implemented method or ii) the computer-implemented method stops at this step, does not change the focus of the tunable lens and proceeds with the next scene in order to tune the tunable lens of the optometry device.

An alternative step of predicting the next fixation point may be realized by determining a gaze direction of the recognized next saccade and predicting the next fixation point based on an object within the determined gaze direction, the object comprising the highest selection probability factor.

Starting from a current fixation point and the beginning of a next saccade, the next fixation point is predicted by analyzing the saccade direction. For example, if the beginning of the next saccade indicates a gaze direction in northeast direction and a plurality of objects in the northeast direction are identifiable and selectable based on the second data set, then the next fixation point will be set at an object comprising the highest selection probability factor of the plurality objects within the gaze direction.

If no object within the saccade direction is identifiable and selectable based on the second data set, then i) the predefined identification probability threshold and/or the predefined selection probability threshold may be decreased to the highest assigned identification probability factor and/or to the highest assigned selection probability factor of the recognized and identified objects in order to ensure the further processing of the computer-implemented method or ii) the computer-implemented method stops at this step, does not change the focus of the tunable lens and proceeds with the next scene in order to tune the tunable lens of the optometry device.

An alternative step of predicting the next fixation point may be realized by using a predefined next scene of the second data library and assigning the distance of the object to the user of the optometry device based on the first data set and adjusting the estimation (or prediction) of the next fixation point based on the predefined next scene.

The term "predefined next scene" describes an item of the second data library. This item is configured to train the machine learning model or to provide testing scenes for the user of the optometry device. Such testing scenes are displayed on a screen, e.g. a monitor or a mobile device display. The "predefined next scene" is evaluated by the computer-implemented method before the scene is shown to the user of the optometry device. The identification probability factor and the selection probability factor of objects within the predefined next scene are determined prior to the recognition of the scene by the user of the optometry device. Hence, the tunable lens of the optometry device is tuned based on the predefined next scene prior to the recognition of the scene by the user of the optometry device.

An alternative step of predicting the next fixation point may be realized by estimating a next scene by generating a fourth data set, the fourth data set comprising electrical brain activity information of the user of the optometry device and adjusting the estimation (or prediction) of the next fixation point based on the estimated next scene.

In a particular view of the present aspect, the term "fourth data set" refers to an output of a sensor comprising electrical brain activity information such as data of an electroencephalography method or an electrooculography method. This output may be represented by voltage signals from different regions of the brain activity, comprising information about the amplitude and the frequency of the voltage signals and providing information about the next gaze and next fixation point of the user.

The starting point for estimating a next scene comprises the detection of the current gaze of the user of the optometry device, e.g. the right side of the visual view of the user. If the user decides to change his view to the left side of the visual view, an electrical brain activity signal is sent to the eye of the user. The brain activity signal is detected and analyzed by the sensor used for generating the fourth data set.

Moreover, the tunable lens of the optometry device is tuned based on the detected and analyzed brain activity signal of the fourth data set. Hence, the fixation of the user is trailing the tuning step of the tunable lens.

An alternative step of predicting the next fixation point may be realized by estimating a next scene by generating a fifth data set, the fifth data set comprising inertia measurement information of the optometry device and adjusting the estimation (or prediction) of the next fixation point based on the estimated next scene.

In a particular view of the present aspect, the term "fifth data set" refers to an output of an inertia measurement unit comprising inertia measurement information such as an angular rate and the orientation of the optometry device by using a combination of accelerometers, gyroscopes, and may be magnetometers, and providing information about the next gaze and next fixation point of the user.

The starting point for estimating a next scene comprises the detection of the current gaze of the user of the optometry device and the associated inertia measurement information to the current gaze of the user. If the user decides to change his view from one side to another, a change in the fifth data set is generated. The change in the fifth data set is detected and analyzed by the inertia measurement unit to generate the fifth data set.

Moreover, the tunable lens of the optometry device is tuned based on the detected and analyzed inertia measurement information of the fifth data set. Hence, the fixation point of the user is trailing the tuning step of the tunable lens.

The first aspect of the disclosure is fully solved by the computer-implemented method of the above described type.

In a second aspect, the present disclosure relates to a system, comprising:
an optometry device,
a first device configured to generate a first data set, the first data set comprising a distance of a user of the optometry device to an object,
a control unit configured to tune the optometry device according to the distance of the user of the optometry device to the object based on the first data set.

The system is characterized in that the first device is a LiDAR sensor.

As generally used, the term "system" refers to at least one apparatus or a plurality of apparatus, particularly connected via a computer network. The plurality of apparatus may be connected via a network by using at least one connection interfaces at any one of the apparatus of the plurality of apparatus.

The term "control unit" refers to a device configured to tune the optometry device according to the data set generated by the other devices. An example for a "control unit" is an Optotune device driver controlled by a PC or a Raspberry Pi.

In an exemplary embodiment, the system comprises a second device, wherein the second device is a camera.

In an exemplary embodiment, the system comprises a second device, wherein the second device is an RGB camera.

In an exemplary embodiment of the system the control unit is configured to tune the optometry device based on the object identified in a second data set recorded by the second device.

In an exemplary embodiment, the system comprising a third device, the third device is an eye-tracker device configured to predict a next gaze of the user based on the third data set.

In an exemplary embodiment of the system the control unit is configured to select the object based on an identification probability factor and a selection probability factor determined as described above with reference to the computer-implemented method.

The second aspect of the disclosure is fully solved by system of the above described type.

BRIEF DESCRIPTION OF THE DRAWINGS

Further features, properties, and advantages of the present disclosure will become clear from the following description of exemplary embodiments of the disclosure in conjunction with the accompanying drawings.

FIGS. 4A, 4B, and 4C show various scenes to illustrate a first exemplary embodiment of a predicting process;

FIGS. 6A, 6B, and 6C show various scenes to illustrate a third exemplary embodiment of a predicting process.

DESCRIPTION OF EXEMPLARY EMBODIMENTS

Figure 1:
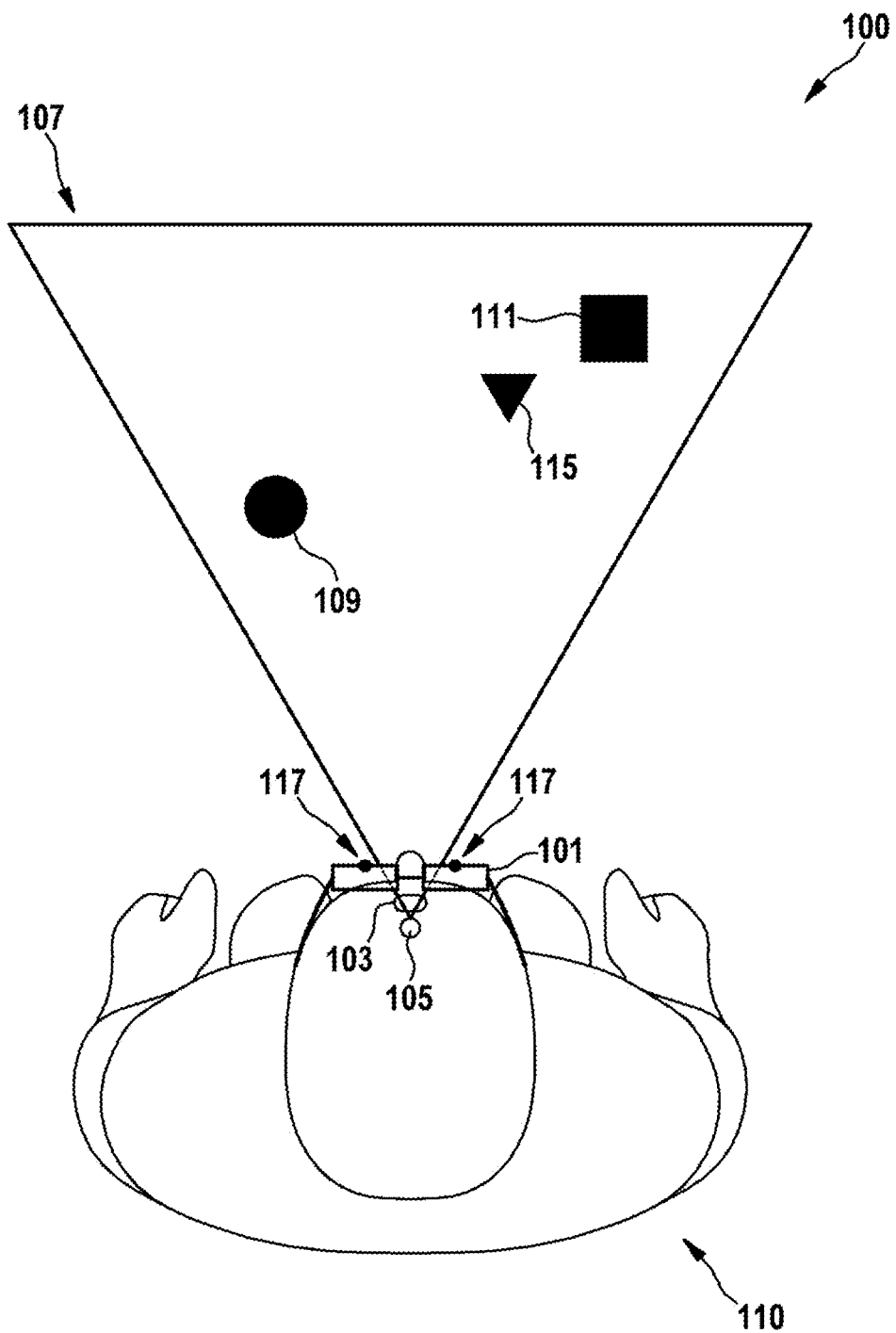
FIG. 1 shows a first exemplary embodiment of a top view onto a user of an optometry device with a tunable lens.

A first exemplary embodiment of the system 100 for operating a tunable lens 101 is shown in FIG. 1. The system 100 is worn by user 110 and comprises a tunable lens 101, a LiDAR sensor 103, an RGB camera 105, an eye tracking device 117 and a control unit (not shown in FIG. 1) which is located within the tunable lens 101.

As shown in FIG. 1 the LiDAR sensor 103 and the RGB camera 105 are recording simultaneously a scene 107, which is observed by the user 110. The scene 107 can comprise several objects 109, 111 and 115. The data set recorded by the LiDAR sensor 103 comprises data representing respective distances of the user 110 to each of the objects 109, 111 and 115. The data set recorded by the RGB camera 105 comprises data representing images of each object 109, 111 and 115. The eye tracking device 117 records the movement of the eye of the user 110 based on the observed scene 107.

Based on the second data set recorded by the RGB camera 105 the objects 107 and 109 are recognized, identified and selected by the control unit of the system 100. Furthermore, based on the first data set recorded by the LiDAR sensor 103 the respective distances of the user 110 to each of the objects 107 and 109 are determined by the control unit of the system 100. The control unit of the system 100 assigns in a next step each distance to the respective object 109, 111 and 115. Based on the selection by the control unit and the determined distance of the selected object, the tunable lens 101 is tuned according to the data of the LiDAR sensor and the data of the RGB camera.

Optionally the data of the eye tracking device 117 may be processed by the control unit of the system 100 and used for tuning the tunable lens 101 according to the data of the LiDAR sensor, the data of the RGB camera and the data of the eye tracking device.

Figure 2:
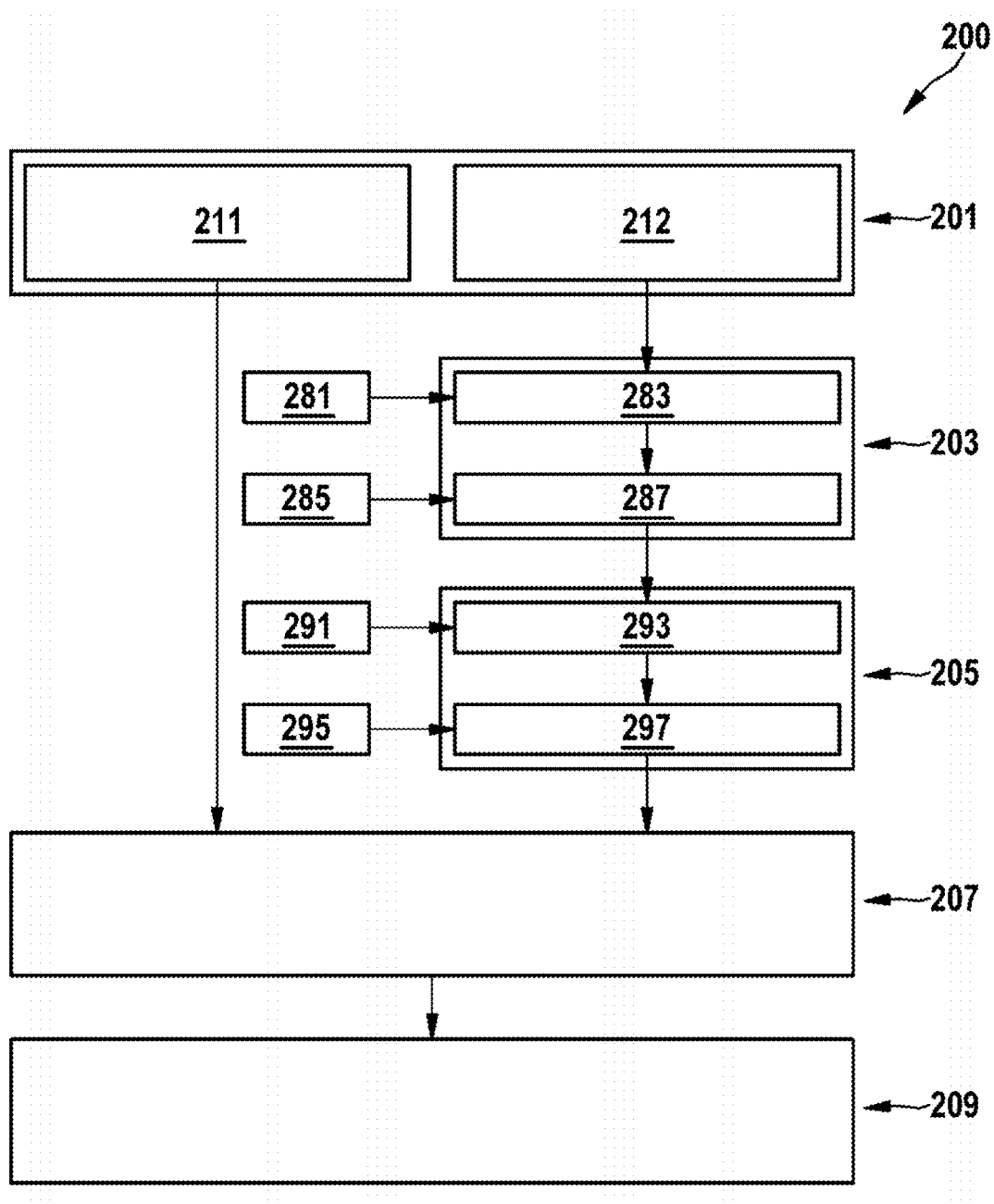
FIG. 2 shows a block diagram of a first exemplary embodiment of the method for operating a tunable lens by using a LiDAR sensor and an RGB camera.

FIG. 2 shows the process steps of a first exemplary embodiment of the method 200 for operating a tunable lens 101, 701 by using a LiDAR sensor 103, 703 and an RGB camera 105, 705 of the systems 100 and 700.

In a first data generating step 201 of the first exemplary embodiment of the method 200 the first data set 211 and the second data set 212 are generated. The first data set 211 is generated by a LiDAR sensor and the second data set 212 is generated by an RGB camera. The first data set 211 and the second data set 212 both comprise the same scene 107 (see FIG. 1), wherein the scene comprises the objects 109, 111 and 115.

Based on the second data set 212, the identification step 203 is executed. In a first sub-step of the identification step 203 an identification probability factor 283 is determined for each of the objects 109, 111 and 115 of the scene 107, based on the second data set 212 and the first data library 281.

In an exemplary embodiment the object 109 can comprise an identification probability factor 283 of 0.8, the object 111 can comprise an identification probability factor 283 of 0.7 and the object 115 can comprise an identification probability factor 283 of 0.6.

In a second sub-step of the identification step 203, the identification probability factor 283 of each identified object 109, 111 and 115 is compared with a predefined identification probability threshold 285. At the end of the second sub step of the identification step 203, the objects with an identification probability factor 283 below the predefined identification probability threshold 285 are ignored for further steps. In the above exemplary embodiment, the predefined identification probability threshold 285 can comprise a value of 0.7. Hence, the object 109 and the object 111 which comprise an identification probability factor 283 equal to or higher than 0.7 will be considered for further steps and the object 115 which comprises an identification probability factor 283 of 0.6 will not be considered for further steps.

Based on the second data set 212 and the identification step 203, the selection step 205 is executed.

In a first sub-step of the selection step 205 a selection probability factor 293 is assigned for the remaining objects 109 and 111 of the scene 107 having an identification probability factor equal to or larger than the identification probability threshold, based on the second data set 212 and the second data library 291. In the above exemplary embodiment, the object 109 may comprise a selection probability factor 293 of 0.8 and the object 111 may comprise a selection probability factor 293 of 0.7.

In a second sub-step of the selection step 205, the selection probability factor 293 of each identified object 109 and 111 is compared with a predefined selection probability threshold 295. At the end of this second sub step of the selection step 205, objects with a selection probability factor 293 below the predefined selection probability threshold 295 are ignored for further steps. If more than one object exceeds the predefined selection probability threshold 295, than the object 297 comprising the higher or highest selection probability factor 293 is selected. In the above exemplary embodiment, the predefined selection probability threshold 295 may comprise a value of 0.7. Hence, the object 109 and the object 111 which comprise a selection probability factor 293 equal to or higher than 0.7 may be considered for further steps. The selection probability factor 293 of object 109 is higher than the selection probability factor 293 of object 111. Hence, the object 109 will be considered for further steps.

Based on the first data set 211 and the selected object 297, the assigning step 207 is executed. In the assigning step 207 the distance of the selected object 297 is assigned to the selected object 297 based on the first data set 211

Based on and following the assigning step 207 the tuning step 209 is executed. In the tuning step 209 the tunable lens 101 is tuned based on the selected object 297 and the distance of the selected object 297 based on the first data set 211. This results in a tuned tunable lens 101.

Figure 3:
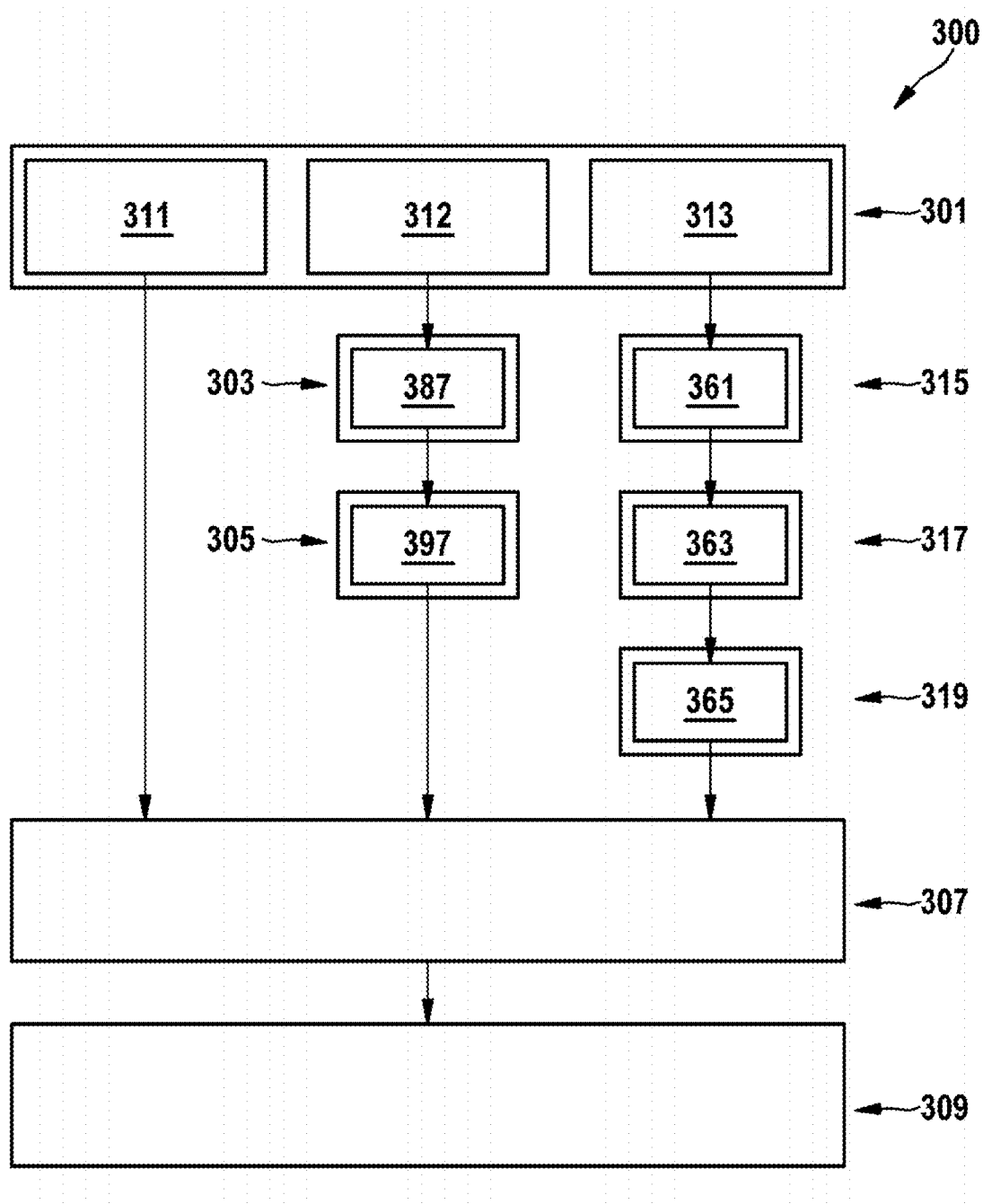
FIG. 3 shows a block diagram of a second exemplary embodiment of the method for operating a tunable lens by using a LiDAR sensor, an RGB camera and an eye tracking device.

FIG. 3 shows a second exemplary embodiment of the method 300 for operating a tunable lens by using a LiDAR sensor 103, an RGB camera 105 and an eye tracking device 117.

In a data generating step 301 of the second exemplary embodiment of the method 300 the first data set 311, the second data set 312 and the third data set 313 are generated. The first data set 311 is generated by the LiDAR sensor 103, the second data set 312 is generated by the RGB camera 105 and the third data 313 set is generated by an eye tracking device 117. The first data set 311 and the second data set 312 both comprise the same scene 107, wherein the scene comprises the objects 109, 111 and 115 (see FIG. 1). The third data set 313 comprises saccade information and fixation point information of the user 110 in the context of the scene 107. In other words, the first data set 311 and the second data set 312 represent the scene 107, whereas the third data set 313 represents the movement of the eyes of the user that are triggered by the scene 107.

Based on the third data set 313, a determining step 315 is executed. In the determining step 315 a current fixation point 361 of the user 110 of the tunable lens 101 is obtained, based on the third data set 313. In an exemplary embodiment the current fixation point 361 is set to the object 109 at the left side of the recognized scene 207.

Based on the current fixation point 361 and the third data set 313, a change in gaze position 362 is detected by a tracking step 317. The change in gaze position 363 may lead to a new fixation point. In the above exemplary embodiment, the gaze position changes from the left side of the recognized scene 107 to the right side of the recognized scene 107.

Based on the change in gaze position 363 detected by the tracking step 317, an estimated fixation point 365 is estimated by a predicting step 319. In this exemplary embodiment the estimated fixation point 365 is set to the object 107 at the right side of the recognized scene 107.

Based on the second data set 312 an identification step 303, which is similar to the identification step 203 of the previous first exemplary embodiment for operating a tunable lens and a selection step 305, which is similar to the selection step 205 of the previous first exemplary embodiment for operating a tunable lens are executed. At the end of the selection step 305 one or more selectable objects 397, which comprise a larger selection probability factor compared to the predefined selection probability threshold, can be suitable for setting the next fixation point.

Based on the first data set 311, the selectable objects 397 based on the second data set 312 and the estimated fixation point 365, an assigning step 307 is executed. In the assigning step 307 the distance of an estimated fixated object 107 to the user 110 based on the first data set 311 and the position of the estimated fixated object 107 is assigned to the new fixation point 365. In other words, the computer-implemented method generates in the assigning step 307 the information that the estimated fixation point 365 is set to the object 107 if the object 107 has a larger selection probability factor as the predefined selection probability threshold.

Based on the assigning step 307 the tuning step 309 is executed. In the tuning step 309 the tunable lens 101 is tuned based on the estimated fixated object 107 and the distance of the estimated fixated object 107 based on the first data set 311. This results in a tuned tunable lens 101.

With the aid of FIGS. 4A to 4C, a first exemplary embodiment of a predicting process 400 based on the method is explained in more detail. Each of FIGS. 4A to 4C represents a same scene observed by the user at different times $t_1$ to $t_3$. This first exemplary embodiment is based on determining a gaze direction of a recognized next saccade and predicting a next fixation point based on the next selectable object within the determined gaze direction.

FIG. 4A shows a scene 407 comprising the objects 409, 411 and 415 and represents the beginning of the predicting process at a time $t_1$=0 s. A current fixation point 461, at the time $t_1$=0 s is assumed to be set at the object 409. The current fixation point 461 is represented as a circle, the circle comprises all possible micro saccades within a fixation point. The current fixation point 461 will remain set at the object 409, as long as the current fixation point 461 at least partially covers the object 409.

FIG. 4B shows the scene 407 comprising the objects 409, 411 and 415 and represents a current saccade 463 within the predicting process at a time $t_2$=0.5 s. The current saccade 463, at the time $t_2$=0.5 s is moving along a direction $d_1$ (see arrow in FIG. 4B) The current saccade 463 will remain moving until the user of the tunable lens fixates a new object.

Based on the detected saccade the computer-implemented method predicts a new fixation point 465 of the user by determining the direction $d_1$ of the current saccade 463 and detecting the next object within the direction $d_1$ of the current saccade 463 which comprises i) an identification probability factor not lower than a predefined identification probability threshold and ii) a selection probability factor not lower than a predefined selection probability threshold.

In a numerical example of the exemplary first embodiment of a predicting process 400, the predefined identification probability threshold is assumed to be set to 0.7 and the predefined selection probability threshold is assumed to be set to 0.7. If one object 415 in the direction $d_1$ of the detected saccade comprises an identification probability factor of 0.8 and a selection probability factor of 0.8, and another object 411 in the direction $d_1$ of the detected saccade comprises an identification probability factor of 0.8 and a selection probability factor of 0.9, both objects 415 and 411 are suitable for setting the predicted fixation point 465.

FIG. 4C shows the scene 407 comprising the objects 409, 411, and 415 and represents the end of the predicting process at a time $t_{3=1.0}$ s. A predicted fixation point 465, at the time $t_{3=1.0}$ s is set at the object 415. The predicted fixation point 465 is set at the object 415 due to the fact, that the object 415 is the next selectable object within the direction $d_1$ of the saccade at the time $t_2$. If the object 415 would not be in the direction $d_1$ of the saccade at the time $t_2$ than the predicted fixation point 465 would be set at the object 411.

Figures 5A, 5B, 5C:
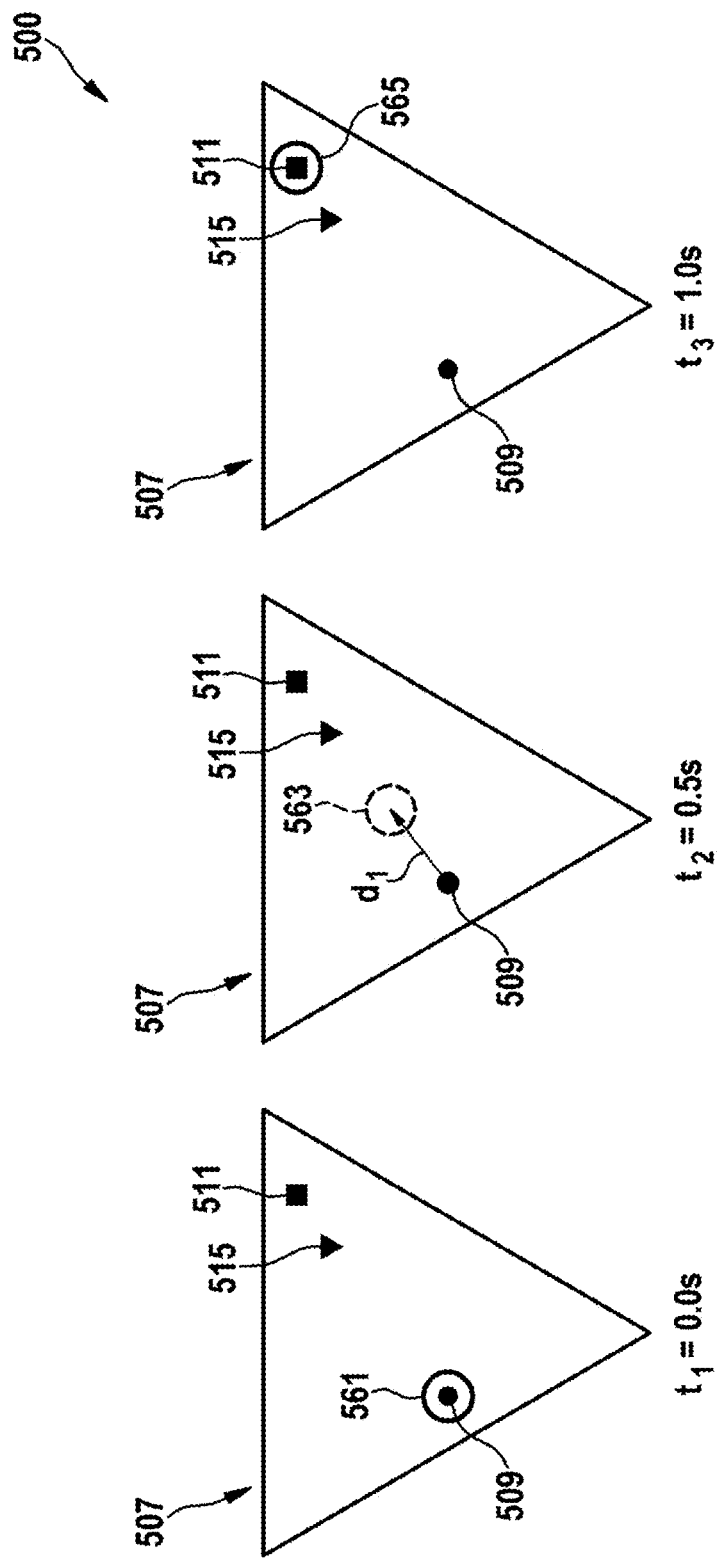
FIGS. 5A, 5B, and 5C show various scenes to illustrate a second exemplary embodiment of a predicting process.

With the aid of FIGS. 5A to 5C, a second exemplary embodiment of a predicting process 500 based on the method is explained in more detail. Each of FIGS. 5A to 5C represents a same scene observed by the user at different times $t_1$ to $t_3$. This second exemplary embodiment is based on determining a gaze direction of the recognized next saccade and predicting the next fixation point based on an object within the determined gaze direction, the object comprising the highest selection probability factor.

FIG. 5A shows the scene 507 comprising the objects 509, 511, and 515 and represents the beginning of the predicting process at a time t=0 s. A current fixation point 561, at the time $t_1$=0 s is assumed to be set at the object 509. The current fixation point 561 is represented as a circle, the circle comprises all possible micro saccades within a fixation point. The current fixation point 561 will remain set at the object 509, as long as the current fixation point 561 at least partially covers the object 509.

FIG. 5B shows the scene 507 comprising the objects 509, 511, and 515 and represents a current saccade 563 within the predicting process at a time $t_2$=0.5 s. The current saccade 563, at the time $t_2$=0.5 s is moving along a direction $d_1$ (see arrow in FIG. 5B). The current saccade 563 will remain moving until the user of the tunable lens fixates a new object.

Based on the detected saccade the computer-implemented method predicts a new fixation point 565 of the user by determining the direction $d_1$ of the current saccade 563 and detecting the objects within the direction $d_1$ of the current saccade 563 which comprise i) an identification probability factor not lower than an predefined identification probability threshold and ii) a selection probability factor not lower than an predefined selection probability threshold and in the case of a plurality of objects, the highest selection probability of the objects.

Like in the example as described with reference to FIGS. 4A to 4C, the predefined identification probability threshold is assumed to be set to 0.7 and the predefined selection probability threshold is assumed to be set to 0.7. If, the object 515 comprises an identification probability factor of 0.8 and a selection probability factor of 0.8 and the object 511 comprises an identification probability factor of 0.8 and a selection probability factor of 0.9, both objects 515 and 511 are suitable for setting the predicted fixation point 565.

FIG. 5C shows the scene 507 comprising the objects 509, 511 and 515 and represents the end of the predicting process at a time $t_3=1.0$ s. A predicted fixation point 565, at the time $t_3=1.0$ s is set at the object 511. The predicted fixation point 565 is set at the object 511 due to the fact, that the object 511 is the selectable object within the direction $d_1$ of the saccade at the time $t_2$ comprising the highest selection probability factor. If the object 511 would not be in the direction $d_1$ of the saccade at the time $t_2$ than the predicted fixation point 565 would be set at the object 515.

With the aid of FIGS. 6A to 6C a third exemplary embodiment of a predicting process 600 based on the method is explained in more detail. Each of FIGS. 6A to 6C represents a same scene observed by the user at different times $t_1$ to $t_3$. This third exemplary embodiment is based on determining a gaze direction of the recognized next saccade and predicting the next fixation point based on previous gaze information of the user.

FIG. 6A shows the scene 607 comprising the objects 609, 611, and 615 and represents the beginning of the predicting process at a time $t_1=0$ s. A current fixation point 661, at the time $t_1=0$ s is assumed to be set at the object 609. The current fixation point 661 is represented as a circle, the circle comprises all possible micro saccades within a fixation point. The current fixation point 661 will remain set at the object 609, as long as the current fixation point 661 at least partially covers the object 609.

FIG. 6B shows the scene 607 comprising the objects 609, 611, and 615 and represents a current saccade 663 within the predicting process at a time $t_2=0.5$ s. The current saccade 663, at the time $t_2=0.5$ s is moving along a direction $d_1$. The current saccade 663 will remain moving until the user of the tunable lens fixates a new object. Based on previous gaze information of the user the estimated length of the current saccade 663 is estimated by a vector $d_2$.

Based on the detected saccade the computer-implemented method predicts a fixation point 665 of the user by determining the direction $d_1$ of the current saccade 663 and by estimating the length of the current saccade 663 by using the length of the vector $d_2$. Adding the vector de to the fixation point 661 at the time $t_1=0$ s may lead to a predicted fixation point 665. The predicted fixation point 665 will be set if i) the predicted fixation point covers at least partially an object within the direction $d_1$ and ii) if the object comprises an identification probability factor not lower than a predefined identification probability threshold and iii) if the object comprises a selection probability factor not lower than a predefined selection probability threshold.

Like in the examples as described with reference to FIGS. 4A to 4C and 5A to 5C in the third exemplary embodiment of a predicting process 600, the predefined identification probability threshold is assumed to be set to 0.7 and the predefined selection probability threshold is assumed to be set to 0.7. If, the object 615 is assumed to comprise an identification probability factor of 0.8 and a selection probability factor of 0.8 and the object 611 is assumed to comprise an identification probability factor of 0.8 and a selection probability factor of 0.9, both objects 615 and 611 are suitable for setting the predicted fixation point 665.

FIG. 6C shows the scene 607 comprising the objects 609, 611 and 615 and represents the end of the predicting process at a time $t_3=1.0$ s. A predicted fixation point 665, at the time $t_3=1.0$ s is set at the object 615 based on the vector $d_2$. The predicted fixation point 665 is set at the object 615 due to the fact, that the object 615 is covered by the predicted fixation 665 based on vector $d_2$ and is located within the direction $d_1$ of the saccade at the time $t_2$. The object 611 will not be selected for setting the predicted fixation point 665, due to the fact that the distance of the object 665 from the actual fixation point 609 does not comply with the length and direction of the vector $d_2$. Hence, the object 611 is not covered by the predicted fixation point 665, despite the fact that the object 611 is located within the direction $d_1$ of the saccade at the time $t_2$ and comprises a higher selection probability factor compared to object 615.

Figure 7:
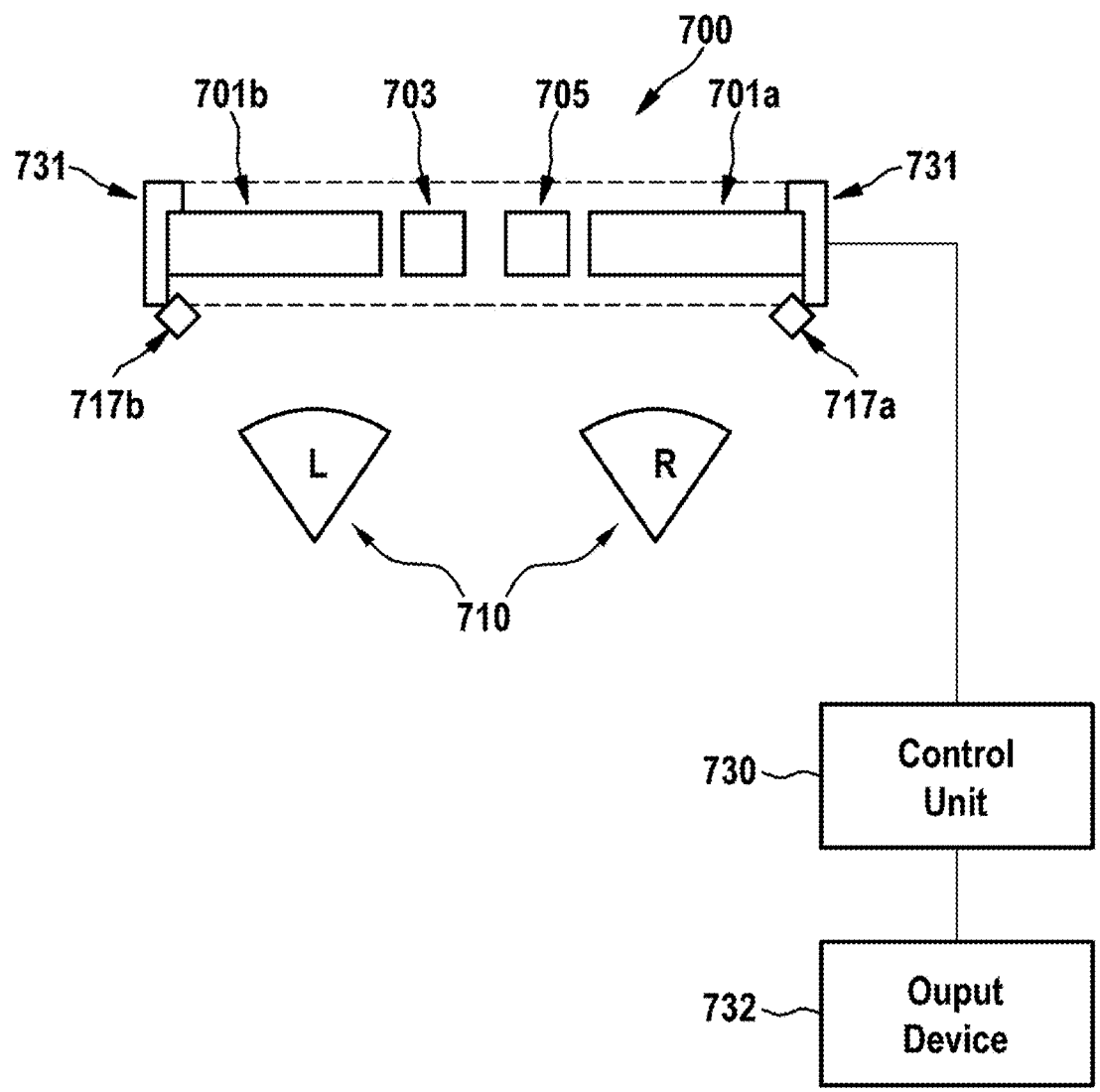
FIG. 7 shows a sectional view of a second exemplary embodiment of an optometry device with a tunable lens.

FIG. 7 shows an optometry device 700 with a tunable lens 701 which can be operated with the method according to the present disclosure. The optometry device 700 is configured to be worn by a user 710 and includes a first tunable lens 701a for the user's right eye R and a second tunable lens 701b for the user's left eye L. Both tunable lenses 701a, 701b are arranged in a frame 731 configured to be worn by the user 710. In an alternative embodiment, the frame 731 can be part of a housing of an optometry device 700 configured to determine the prescription values of the user 710.

The frame 731 comprises a LiDAR sensor 703, an RGB camera 705 and an eye tracking device or two eye tracking devices 717a, 717b, one for detecting movements of the right eye R and one for detecting movements of the left eye L of the user 710. The viewing direction of the LiDAR sensor 703 and the camera 705 are directed into the viewing direction of the right eye R and the left eye L of the user 710. Optics of the LiDAR sensor 703 and RGB camera 705 are configured that both devices record data of an almost identical scene. The detection direction of the eye tracking devices 717a, 717b is almost in the opposite direction of the viewing direction of the LiDAR sensor 703 and the camera 705, i.e. into the direction of the eyes R, L of the user 710.

The optometry device 700 furthermore comprises a control unit 730 receiving data from the LiDAR sensor 703, the RGB camera 705 and the eye tracking devices 717a, 717b. The control unit 730 generates control data for the tunable lenses 701a, 701b as described in more detail above. In addition, the control unit 730 generates output data describing correction values necessary to correct the viewing capabilities of the eyes R, L of the user 710, which can be outputted to and shown on a display or any other suitable output device 732. The control unit 730 also can be arranged on the frame 731 but also can be arranged separately from frame 731, for example in a console for operating an optometry device.

The foregoing description of the exemplary embodiments of the disclosure illustrates and describes the present invention. Additionally, the disclosure shows and describes only the exemplary embodiments but, as mentioned above, it is to be understood that the disclosure is capable of use in various other combinations, modifications, and environments and is capable of changes or modifications within the scope of the concept as expressed herein, commensurate with the above teachings and/or the skill or knowledge of the relevant art.

The term "comprising" (and its grammatical variations) as used herein is used in the inclusive sense of "having" or "including" and not in the exclusive sense of "consisting only of." The terms "a" and "the" as used herein are understood to encompass the plural as well as the singular.

All publications, patents and patent applications cited in this specification are herein incorporated by reference, and for any and all purposes, as if each individual publication, patent or patent application were specifically and individually indicated to be incorporated by reference. In the case of inconsistencies, the present disclosure will prevail.

The invention claimed is:

1. A computer-implemented method for operating an optometry device, the method comprising the following steps:
   generating a first data set, the first data set containing information about a distance of a user of the optometry device to at least one object included in a scene, wherein the first data set is generated by using a LiDAR sensor, the LiDAR sensor being configured to measure the distance of the user of the optometry device to the at least one object by evaluating the scene represented by the first data set;
   generating a second data set by recording an image of the scene by a camera, wherein the first data set and the second data set both include a same scene;
   identifying, by a control unit, the at least one object by evaluating the scene represented by the second data set;
   generating a third data set by an eye-tracking sensor, the third data set including gaze information of the user of the optometry device;
   predicting a next gaze of the user based on the third data set; and
   tuning a tunable lens of the optometry device based on the predicted next gaze of the user and on the distance to the identified object included in the first data set.

2. The computer-implemented method according to claim 1, wherein the recording of the image is performed by utilizing an RGB camera.

3. The computer-implemented method according to claim 1, wherein identifying the at least one object comprises:
   recognizing a plurality of objects in the image of the scene represented by the second data set;
   including a first data library for generating an identification probability factor for each recognized object of the plurality of objects;
   assigning the identification probability factor to each object of the plurality of objects based on the first data library;
   comparing the identification probability factor of each identified object of the plurality of objects with a predefined identification probability threshold;
   utilizing a second data library for generating a selection probability factor for each identified object of the plurality of objects having an identification probability factor equal to or larger than the predefined identification probability threshold;
   comparing the selection probability factor of at least each identified object of the plurality of objects having the identification probability factor equal to or larger than the predefined identification probability threshold with a predefined selection probability threshold; and
   determining the distance of the user of the optometry device to the identified object with a largest selection probability factor, wherein the selection probability factor of the identified object is larger than the predefined selection probability threshold.

4. The computer-implemented method according to claim 3, wherein a machine learning algorithm is used to determine the identification probability factor stored in the first data library and the selection probability factor stored in the second data library.

5. The computer-implemented method according to claim 1, wherein predicting the next gaze of the user comprising the following steps:
   determining a current fixation point of the user of the optometry device based on the third data set;
   assigning the object based on the second data set and the distance of the object to the user of the optometry device based on the first data set to the current fixation point of the user of the optometry device;
   tracking the current fixation point of the user of the optometry device based on the third data set until a next saccade of the user of the optometry device is recognized by detecting a change in gaze position;
   predicting a next fixation point of the user of the optometry device based on the current fixation point of the user of the optometry device and the recognized next saccade of the user of the optometry device; and
   tuning the optometry device according to the predicted next fixation point.

6. The computer-implemented method according to claim 5, wherein predicting the next fixation point comprises at least one of the following steps:
   determining a gaze direction of the recognized next saccade and predicting the next fixation point based on previous gaze information of the user;
   determining the gaze direction of the recognized next saccade and predicting the next fixation point based on the next selectable object within the determined gaze direction;
   determining the gaze direction of the recognized next saccade and predicting the next fixation point based on an object within the determined gaze direction, the object including a highest selection probability factor;
   utilizing a predefined next scene of the second data library and assigning the distance of the object to the user of the optometry device based on the first data set and adjusting the estimation of the next fixation point based on the predefined next scene;
   estimating a next scene by generating a fourth data set, the fourth data set including electrical brain activity information of the user of the optometry device and adjusting the estimation of the next fixation point based on estimated next scene; and
   estimating a next scene by generating a fifth data set, the fifth data set including inertia measurement information of the optometry device and adjusting the estimation of the next fixation point based on estimated next scene.

7. A system comprising:
   an optometry device;
   a first device configured to generate a first data set, the first data set including a distance of a user of the optometry device to at least one object included in a scene, wherein the first device is a LiDAR sensor;
   a control unit configured to tune a tunable lens of the optometry device;
   a second device configured to generate a second data set by recording an image of the scene, wherein the second device is a camera, wherein the first data set and the second data set both includes a same scene; and
   a third device configured to generate a third data set, the third data set including gaze information of the user and configured to predict a next gaze of the user based on the third data set, wherein the third device is an eye-tracker device,
   wherein the control unit is configured to tune the tunable lens of the optometry device based on the predicted next gaze of the user and on the distance to the identified object included in the first data set.

8. The system according to claim 7, wherein the camera is an RGB camera.

9. The system according to one of claim 7, wherein the control unit is configured to select the object based on an identification probability factor and a selection probability factor.

* * * * *